US009486040B2

(12) United States Patent
Theobald

(10) Patent No.: US 9,486,040 B2
(45) Date of Patent: Nov. 8, 2016

(54) MAGNETICALLY OPERATED LOCKING SLIDER FOR ZIPPER

(71) Applicant: James Theobald, Kingston-upon-Thames (GB)

(72) Inventor: James Theobald, Kingston-upon-Thames (GB)

(73) Assignee: James Theobald, Kingston-Upon-Thames (GB)

( * ) Notice: Subject to any disclaimer, the term of this patent is extended or adjusted under 35 U.S.C. 154(b) by 0 days.

(21) Appl. No.: 14/766,705

(22) PCT Filed: Jan. 20, 2014

(86) PCT No.: PCT/EP2014/051000
§ 371 (c)(1),
(2) Date: Aug. 7, 2015

(87) PCT Pub. No.: WO2014/122001
PCT Pub. Date: Aug. 14, 2014

(65) Prior Publication Data
US 2015/0374076 A1 Dec. 31, 2015

(30) Foreign Application Priority Data

Feb. 7, 2013 (GB) .................................. 1302173.8

(51) Int. Cl.
*B65D 33/00* (2006.01)
*A44B 19/30* (2006.01)
(Continued)

(52) U.S. Cl.
CPC ............ *A44B 19/303* (2013.01); *A44B 19/30* (2013.01); *B65D 33/2591* (2013.01); *F16B 1/00* (2013.01); *F16B 2001/0035* (2013.01)

(58) Field of Classification Search
CPC .... A44B 19/26; A44B 19/30; A44B 19/301; A44B 19/305; A44B 19/306; A44B 19/308
USPC .................................................. 383/97, 106
See application file for complete search history.

(56) References Cited

U.S. PATENT DOCUMENTS 2,045,626 A * 6/1936 Winterhalter .......... A44B 19/30
24/421
2,599,078 A 6/1952 Sundback
(Continued)

FOREIGN PATENT DOCUMENTS

DE 196 31 094 A1 2/1998
DE 202012101550 U 11/2012
(Continued)

OTHER PUBLICATIONS

Machine translation of the description of JP 2001311330 A.*
(Continued)

*Primary Examiner* — Jes F Pascua
(74) *Attorney, Agent, or Firm* — Maschoff Brennan

(57) ABSTRACT

A zipper has a slider moveable in an opening direction to open the zipper and in a closing direction to close the zipper. The slider comprises a control member and a casing, the control member being moveable between a locking position in which movement of the slider in the opening direction is prevented and an unlocking position in which movement of the slider in the opening direction is allowed. When the control member is in the locking position the casing at least partially encloses the control member so as to substantially prevent the application of a contact force tending to move the control member from the locking position to the unlocking position. The control member is at least partly formed of a material to which a magnetic force is applied by a permanent magnet in proximity.

24 Claims, 4 Drawing Sheets

(51) Int. Cl.
   *B65D 33/25*    (2006.01)
   *F16B 1/00*     (2006.01)

(56)            References Cited

U.S. PATENT DOCUMENTS 4,015,296  A  *  4/1977   Malick ................ A41B 11/00
                                                         2/239
   4,221,027  A  *  9/1980   Oda .................. A44B 19/30
                                                        24/424
   4,262,502  A     4/1981   Oda
   4,438,550  A  *  3/1984   Oda .................. A44B 19/30
                                                        24/418
   4,951,485  A     8/1990   Wake
   5,255,418  A    10/1993   Chen 2015/0287561  A1 *  10/2015  Levesque .......... A45C 13/1069
                                                         190/100

FOREIGN PATENT DOCUMENTS

GB         1477290   A       6/1977
   JP       2000 320215 A      11/2000
   JP       2001311330  A  *   11/2001

OTHER PUBLICATIONS

International Search Report mailed Apr. 4, 2014, in related PCT Application No. PCT/EP2014/051000 (2 pages).
GB Search Report dated Jul. 31, 2013, for related GB Application No. 1302173.8 (2 pages).

* cited by examiner

MAGNETICALLY OPERATED LOCKING SLIDER FOR ZIPPER

BACKGROUND

A commonplace type of zipper comprises two rows of inter-lockable elements (or teeth) and a slider which can be moved in an opening direction to open the zipper and in a closing direction to close the zipper.

Examples of such zippers are disclosed in U.S. Pat. No. 2,599,078 and U.S. Pat. No. 5,255,418. Each of these documents discloses a zipper that has a slider which includes an automatic locking mechanism that serves to prevent unintentional movement of the slider in the opening direction. In each case, the locking mechanism includes a control member that is moveable from a locking position, in which movement of the slider in the opening direction is prevented, to an unlocking position. Movement of the control member from the locking position to the unlocking position is achieved by application of a force to the control member via a pull tab which physically engages the control member. In both U.S. Pat. No. 2,599,078 and U.S. Pat. No. 5,255,418, the control member has a pin, formed integrally with the control member, the pin interposing between the elements of the zipper to achieve the locking.

Other zippers have sliders that are provided with security locking mechanisms incorporating combination locks or key operated locks and which allow the slider to be locked to prevent unauthorised opening of the zipper.

SUMMARY

According to a first aspect of the invention, there is provided a zipper having a slider moveable in an opening direction to open the zipper and in a closing direction to close the zipper, the slider comprising a control member and a casing, the control member being moveable between a locking position in which movement of the slider in the opening direction is prevented and an unlocking position in which movement of the slider in the opening direction is allowed, wherein when the control member is in the locking position the casing at least partially encloses the control member so as to substantially prevent the application of a contact force tending to move the control member from the locking position to the unlocking position, the control member being at least partly formed of a material to which a magnetic force is applied by a permanent magnet in proximity whereby to allow the control member to be moved from the locking position to the unlocking position by application of a magnetic force to the control member.

According to a second aspect of the invention, there is provided a slider for a zipper, comprising a control member and a casing, the control member being moveable between a locking position for preventing opening of a zipper incorporating the slider and an unlocking position for allowing opening of the zipper, wherein when the control member is in the locking position the casing at least partially encloses the control member so as to substantially prevent the application of a contact force tending to move the control member from the locking position to the unlocking position, the control member being at least partly formed of a material to which a magnetic force is applied by a permanent magnet in proximity whereby to allow the control member to be moved from the locking position to the unlocking position by application of a magnetic force to the control member.

As used herein the term "contact force" refers to a mechanical force applied through physical contact between two solid objects such as a force applied by pushing or mechanical engagement, or a force applied via friction, but does not extend to any force which requires adhesion between the two objects nor to magnetic attraction or repulsion between the two objects.

Proximity, as used herein encompasses both nearby but not touching, and also touching.

Preferably, in either the first or second aspects of the invention, the casing substantially fully encloses the control member. The control member is moveable from the locking position to the unlocking position by a magnetic force applied to the control member by a permanent magnet in proximity to and external to the casing.

According to a third aspect of the invention, there is provided a zipper having a slider moveable in an opening direction to open the zipper and in a closing direction to close the zipper, the slider comprising a control member and a casing, the control member being moveable between a locking position in which movement of the slider in the opening direction is prevented and an unlocking position in which movement of the slider in the opening direction is allowed, the casing substantially fully enclosing the control member, the control member being at least partly formed of a material to which a magnetic force is applied by a permanent magnet in proximity whereby to allow the control member to be moved from the locking position to the unlocking position by application of a magnetic force to the control member by a permanent magnet in proximity to and external to the casing.

According to a fourth aspect of the invention, there is provided a slider for a zipper, comprising a control member and a casing, the control member being moveable between a locking position for preventing opening of a zipper incorporating the slider and an unlocking position for allowing opening of the zipper, the casing substantially fully enclosing the control member, the control member being at least partly formed of a material to which a magnetic force is applied by a permanent magnet in proximity whereby to allow the control member to be moved from the locking position to the unlocking position by application of a magnetic force to the control member by a permanent magnet in proximity to and external to the casing.

Unless otherwise stated, the following preferred features are independent of one another and are applicable to all aspects of the invention.

Preferably, the magnetic force is magnetic attraction. The material is preferably a ferrite material. The casing is preferably formed of a non-magnetic material.

Preferably, the slider is provided with means for resiliently urging the control member into the locking position. Where such resilient urging means are provided, it is desirable for the slider to have a detent mechanism operable to hold the control member in the unlocking position, against the resilient urging means, once the control member has been moved to the unlocking position.

Preferably, the slider is provided with a button which can be operated directly by hand to move the control member from the unlocking position to the locking position. The button may be part of the casing. Where both a button and a detent mechanism are provided, operation of the button over-rides the detent mechanism to move the control member from the unlocking position to the locking position.

Preferably, the zipper has two rows of inter-lockable elements and the slider includes a locking member moveable between a locking position and an unlocking position. When the locking member is in the locking position, the locking member is interposed between the elements to prevent sliding movement of the slider in the opening direction and when the locking member is in the unlocking position the slider is slideable in the opening direction to open the zipper. Movement of the control member from the locking position to the unlocking position causes or allows the locking member to move from the locking position to the unlocking position.

Where such a locking member is provided, the control member is preferably operatively linked to the locking member so that movement of the control member from the locking position to the unlocking position causes the locking member to move from the locking position to the unlocking position. This can be achieved by magnetic attraction between the control member and the locking member.

Where a locking member is provided, the locking member preferably has a pivot portion and a pin portion. The locking member pivots between the locking position and the unlocking position substantially around a point defined by the pivot portion and the pin portion is interposed between elements to prevent movement of the slider in the opening direction when the locking member is in the locking position.

Preferably, the slider defines a Y-shaped channel for receiving two rows of zipper elements. In this case, the slider includes a locking pin which projects into the Y-shaped channel when the control member is in the locking position. Preferably, the locking pin is at least partially retracted from the Y-shaped channel when the control member is in the unlocking position.

According to a fifth aspect of the invention, there is provided a kit comprising a zipper according to the first or third aspects of the invention and a permanent magnet for moving the control member from the locking position to the unlocking position.

According to a sixth aspect of the invention, there is provided a security bag comprising a bag closed by a zipper according to the first or third aspects of the invention. The bag is preferably formed at least partially from a transparent plastics material so as to allow the contents of the bag to be viewed.

BRIEF DESCRIPTION OF THE DRAWINGS

The following is a more detailed description of embodiments of the invention, by way of example, reference being made to the appended schematic drawings in which.

Figure 1:
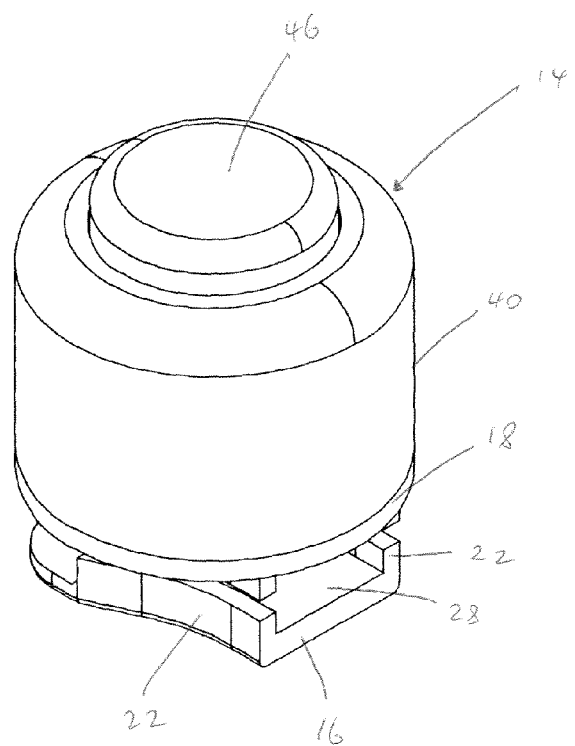
FIG. 1 is an isometric drawing from above showing a slider of a zipper.
Figure 2:
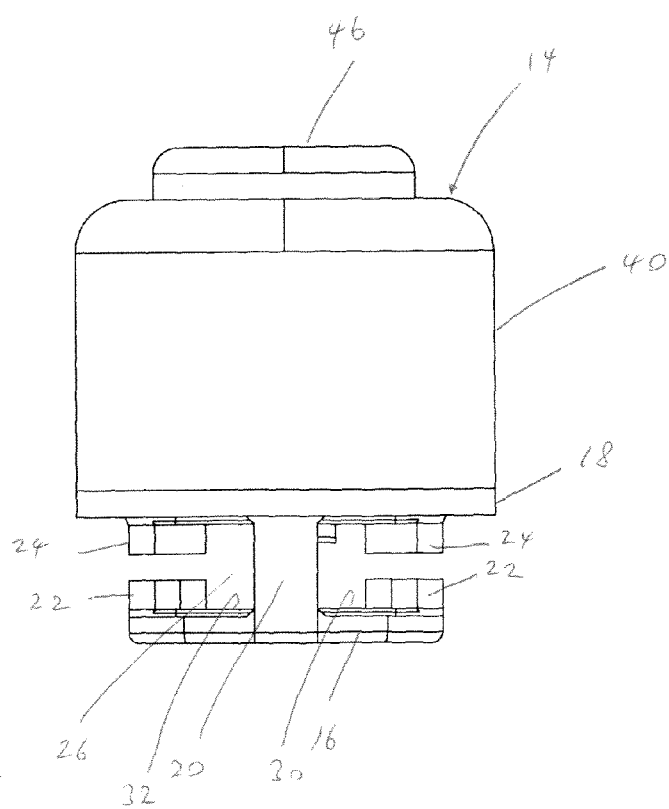
FIG. 2 is a front elevation of the slider of FIG. 1.
Figure 6:
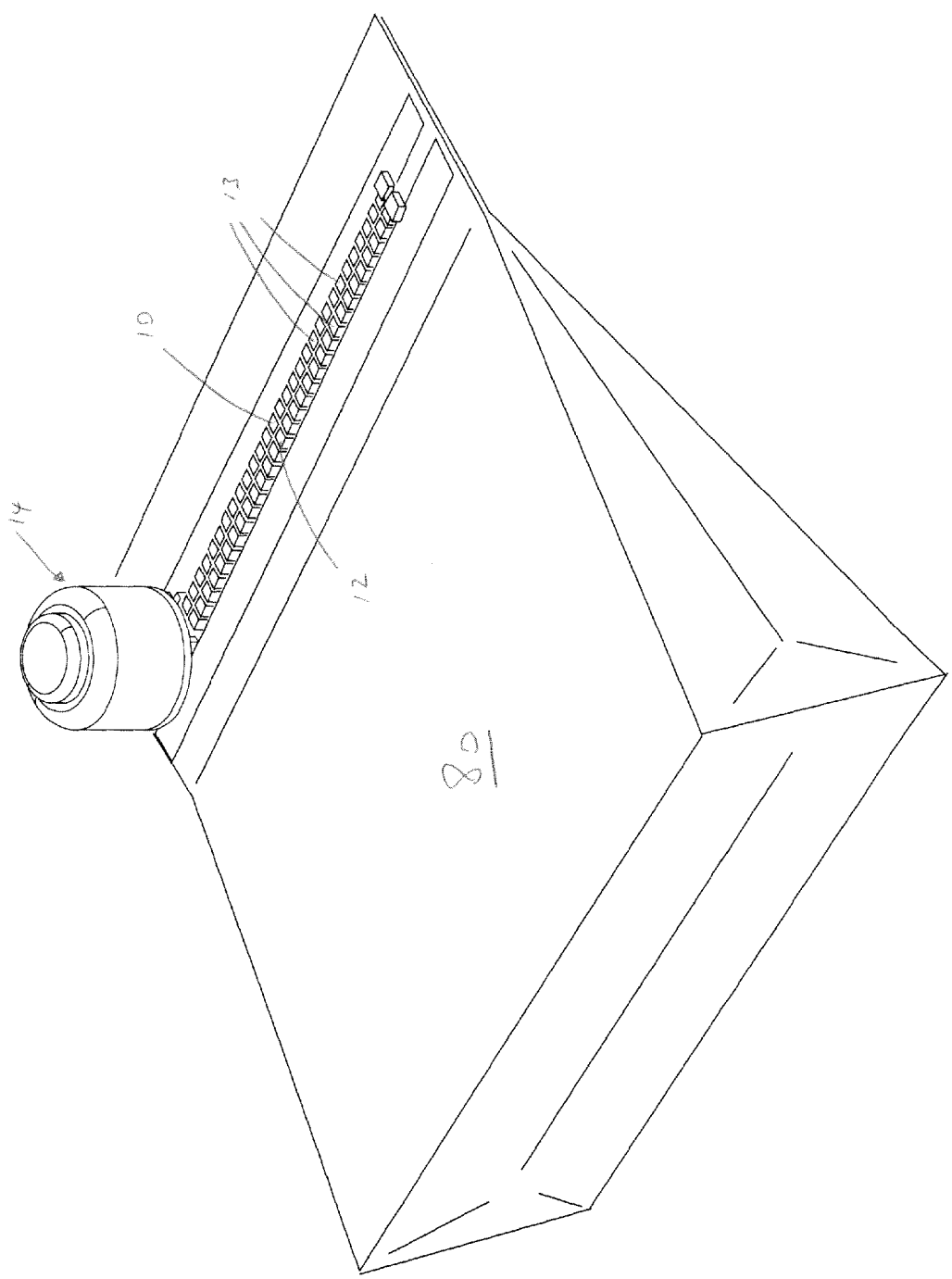
FIG. 6 shows the zipper incorporated in a security bag.

Referring first to FIGS. 1, 2 and 6, the zipper comprises two rows 10, 12 of inter-lockable elements 13 and a slider 14. The two rows 10, 12 of inter-lockable elements 13 are conventional in design and will not be described in detail. The elements 13 of each row 10, 12 may be, for example, metal or plastic elements 13 mounted, in a known manner, on a plastic strip so as to form the row 10, 12.

DETAILED DESCRIPTION

The slider 14 is engaged with the two rows 10, 12 of elements 13 so that the slider 14 can be slid both in an opening direction, so as to open the zipper, and also in a closing direction, so as to close the zipper.

Referring now to FIGS. 1 to 4, the slider 14 has a bottom plate 16, a top plate 18 and a separator 20 which connects the bottom plate 16 and the top plate 18 and which holds the two plates 16, 18 mutually parallel to and spaced from one another.

As best seen in FIG. 2, the bottom plate 16 has two flanges 22 and the top plate 18 has two flanges 24. In a conventional manner, the bottom plate 16, the top plate 18, the separator 20, the bottom plate flanges 22 and the top plate flanges 24 together define a Y-shaped channel 26 which receives the two rows 10, 12 of elements 13. At the rear of the slider 14 (see FIG. 1), the Y-shaped channel 26 has a rear opening 28 through which extend the two rows 10, 12 of elements 13 in an inter-locked state (seen in FIG. 6). At the front of the slider 14 (see FIG. 2) the Y-shaped channel 26 has two front openings 30, 32, through which extend respective ones of the two rows 10, 12 of elements 13 in a disengaged state (not shown).

Figure 4:
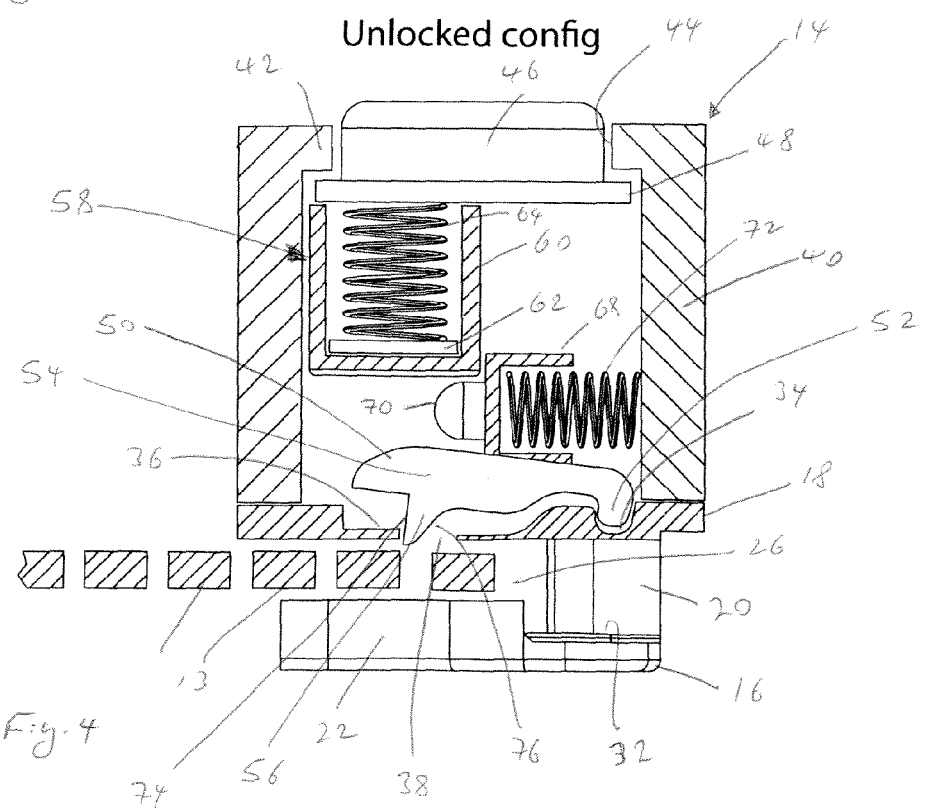
FIG. 4 is a representation, partially in cross-section, showing the slider of FIGS. 1 to 3 in an unlocking configuration, and also showing some elements of the zipper.

The opening direction of movement of the slider 14 corresponds to movement of the slider 14, relative to the two rows 10, 12 of elements 13, from the right hand side to the left hand side as shown in FIG. 4. Conversely, the closing direction of movement of the slider 14 corresponds to movement of the slider 14, relative to the two rows 10, 12 of elements 13, from the left hand side to the right hand side as shown in FIG. 4. The manner in which the slider 14 opens and closes the zipper is conventional.

Referring to FIGS. 1 to 4, the top plate 18 is generally disc-shaped. An upper surface of the top plate 18 is formed with a first recess 34, a second recess 36, and an aperture 38 which extends from the bottom of the second recess 36, completely through the top plate 18, to a lower surface of the top plate 18.

Figure 3:
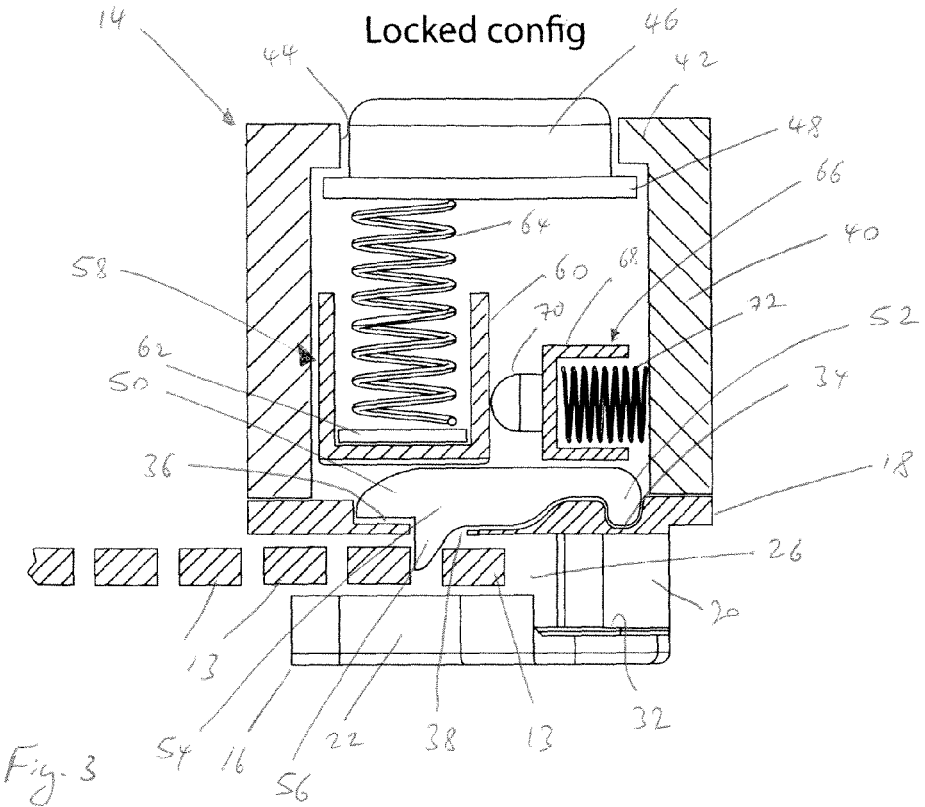
FIG. 3 is a representation, partially in cross-section, showing the slider of FIGS. 1 and 2 in a locking configuration and also showing some elements of the zip.

A cylindrical wall 40 is fixed to the upper surface of the top plate 18, around the periphery of the top plate 18. An upper end of the cylindrical wall 40 is provided with an inwardly projecting flange 42 and an opening 44. A button 46 fits within the opening 44. The button 46 is provided with a flange 48 which cooperates with the flange 42 on the cylindrical wall 40 to prevent the button 46 from moving in an upward direction, as shown in FIGS. 3 and 4, out of the opening 44. The button 46 and the cylindrical wall 40 are formed of a plastics material.

As seen in FIGS. 3 and 4, the slider 14 has a pivoting locking member 50. The locking member 50 is formed of stainless steel and has, at one end, a pivoting portion 52. The pivoting portion 52 is received in the first recess 34 of the top plate 18 so as to allow the locking member 50 to pivot generally around the pivoting portion 52. The locking member 50 also has a body portion 54 from which projects a locking pin 56. As best seen in FIG. 3, the body portion 54 of the locking member 50 is shaped so as to be received within the second recess 36 of the top plate 18, whereupon the locking pin 56 projects through the aperture 38 of the top plate 18.

Still referring to FIGS. 3 and 4, the slider 14 also includes a control member 58. The control member 58 has a cup portion 60 with an open end facing upwardly towards the button 46 and a closed end facing downwardly towards the top plate 18. The cup portion 60 is also made of stainless steel. A small disc-shaped permanent magnet 62 is fixed inside the cup portion 60 at the closed end of the cup portion 60. A first helical spring 64 is held within the cup portion 60 and acts between the disc-shaped magnet 62 and the button 46 so as to urge the control member 58 downwardly into contact with the body portion 54 of the pivoting locking member 50.

The slider 14 also includes a detent 66. The detent 66 includes a cup portion 68 which has an open end facing towards the cylindrical wall 40 and a closed end facing generally towards the control member 58. A rounded head 70 is provided on the closed end of the cup portion 68. A second helical spring 72 is held within the cup portion 68 and acts between the cup portion 68 and the cylindrical wall 40 to urge the cup portion 68 and the rounded head 70 towards the control member 58. The cup portion 68 and the rounded head 70 of the detent 66 are formed of a plastics material.

Although not shown for the purpose of clarity, the slider 14 may also be provided with various internal walls or structures serving to hold the control member 58 and the detent 66 in the correct positions, so as to allow movement of the control member 58 and the detent 66 between the positions shown in FIGS. 3 and 4.

The operation of the zipper will now be described.

The natural configuration of the slider 14 is the locking configuration that is shown in FIG. 3. In this locking configuration, the cup portion 60 of the control member 58 is held downwardly by the first helical spring 64, so that the cup portion 60 bears against the body portion 54 of the pivoting locking member 50. In turn, the pivoting locking member 50 is held down by the control member 58 so that the body portion 54 lies within the second recess 36 of the top plate 18 and the locking pin 56 passes through the aperture 38 in the top plate 18. As seen in FIG. 3, the locking pin 56 is interposed between elements 13 from the two rows 10, 12 of elements 13.

The locking pin 56 has a first planar surface 74 which, when the pivoting locking member 50 is in the locking position shown in FIG. 3, lies perpendicular to the two rows 10, 12 of elements 13. Contact between the planar surface 74 and one of the elements 13 of the two rows 10, 12, prevents sliding movement of the slider 14 in the opening direction (that is to say from the right hand side to the left hand side as shown in FIG. 3).

The locking pin 56 also has an angled surface 76. When the pivoting locking member 50 is in the locking position, as shown in FIG. 3, the angled surface 76 is inclined in relation to the two rows 10, 12 of elements 13. If a force is applied to the slider 14, tending to move the slider 14 in the closing direction (from left to right as shown in FIG. 3), the angled surface 76 cams against an element 13 of the two rows 10, 12 and this, in turn, causes the pivoting locking member 50 to pivot so that locking pin 56 is disengaged from between the elements 13 of the two rows 10, 12. In this way, as the slider 14 is moved in the closing direction, the pivoting locking member 50 acts as a pawl, ratcheting against the elements 13 of the two rows 10, 12. Any attempt to move the slider 14 in the opening direction causes the locking pin 56 to lock against an element 13 of the two rows 10, 12 thereby preventing opening of the zipper. This is achieved because the control member 58, under the operation of the first helical spring 64, bears against the pivoting locking member 50, urging the pivoting locking member 50 into the locking position shown in FIG. 3.

As seen in FIGS. 3 and 4, the control member 58 is substantially entirely enclosed within a casing consisting of the cylindrical wall 40, the button 46 and the top plate 18. The fact that the control member 58 is encased means that it is not possible to contact the control member 58 with either a finger or a tool such as a screwdriver, so as to move the control member 58 upwardly out of the locking position shown in FIG. 3.

Figure 5:
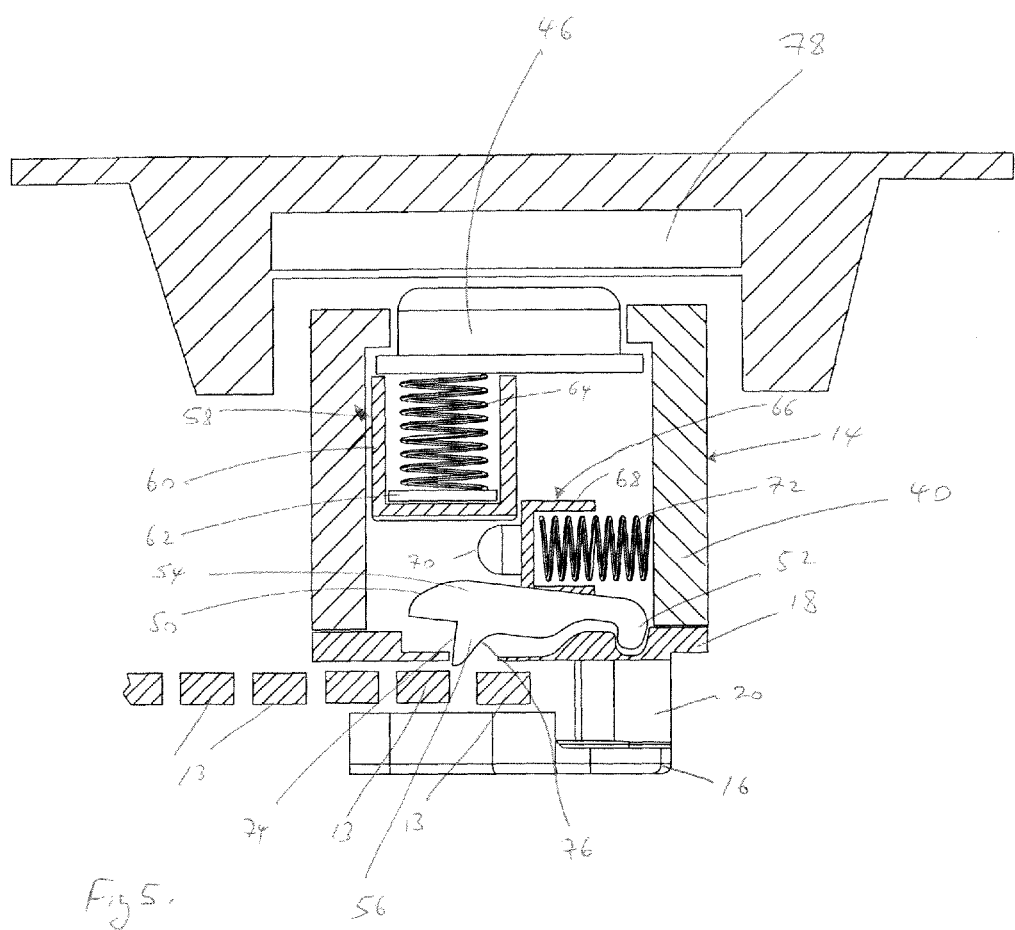
FIG. 5 is a similar view to FIG. 4, showing a retail magnet detacher in close proximity to the top of the slider.

In order to unlock the slider 14 from the locked configuration shown in FIG. 3 to the unlocked configuration shown in FIG. 4, it is necessary to use a powerful permanent magnet, as shown in FIG. 5. FIG. 5 shows a detaching magnet 78 of a type that is commonly used in retail outlets to remove security tags from articles such as clothing. When the detaching magnet 78 is placed lightly against the button 46, an attractive magnetic force acts between the detaching magnet 78 and the cup portion 60 of the control member 58 (the cup portion 60 being made of stainless steel). This magnetic force causes the cup portion 60 to move upwardly into an unlocking position against the button 46, as shown in FIGS. 4 and 5. This movement causes the first helical spring 64 to become compressed. Once the cup portion 60 contacts the button 46, the rounded head 70 of the detent 66 no longer engages the cup portion 60 and this allows the detent 66 to move, under the operation of the second helical spring 72, in the right to left direction as shown in FIGS. 3 to 5. This movement, in turn, causes the rounded head 70 of the detent 66 to engage under the closed end of the cup portion 60 of the control member 58. When in this position, the detent 66 prevents the control member 58 from moving back down towards the pivoting locking member 50. Once the detent 66 has acted to hold the control member 58 in the unlocking position shown in FIGS. 4 and 5, the control member 58 remains in the unlocking position even if the detaching magnet 78 is removed.

The control member 58 no longer pushes down against the pivoting locking member 50. The disc magnet 62 provided in the control member 58 attracts the pivoting locking member 50 (which is made of stainless steel) and causes the pivoting locking member 50 to pivot into the unlocking raised position shown in FIGS. 4 and 5. In this unlocking position, the locking pin 56 is no longer interposed between the elements 13 of the two rows 10, 12. Hence, with the control member 58 in the unlocking position, the slider 14 can be moved freely in either the opening direction or the closing direction.

The slider 14 is returned to the locking configuration shown in FIG. 3 by depressing the button 46. When the button 46 is depressed, this pushes down the control member 58. In turn, the cup portion 60 of the control member 58 bears down on the rounded head 70 of the detent 66 and this pushes the detent 66 back towards the cylindrical wall 40, against the second helical spring 72, so as to allow the control member 58 to move downwardly and into contact with the pivoting locking member 50. During this operation, the rounded head 70 of the detent 66 moves back into contact with the circumferential surface of the cup portion 60 of the control member 58. The control member 58, under the force applied by the first helical spring 64, pushes the pivoting locking member 50 back into the locking position shown in FIG. 3. Hence, again, movement of the slider in the opening direction is prevented.

Hence, the zipper is normally in a locking configuration, preventing unauthorised opening of the zipper. However, the zipper can be unlocked, using a strong permanent magnet of a type already commonly used in the retail trade, in a manner which is fast, easy and fool-proof. Unlike existing zippers which can be locked against unauthorised opening, there is no need to remember a code of a combination lock or to carry an appropriate key. The slider can be locked simply by pressing the button 46.

A highly desirable use of the zipper is shown in FIG. 6. FIG. 6 shows the zipper mounted on a bag 80 which is conveniently used as a security bag in a retail environment, such as in a supermarket. The bag 80 is formed of a tough plastics material which is resistant to ripping or cutting. The bag 80 is also transparent so that any product placed within the security bag can be readily viewed by a potential customer. The bag 80 may also be provided with a security tag designed to trigger an audible alarm if an attempt is made to carry the security bag 80 out of the retail environment.

In use, a product is placed within the bag and the zipper is closed by sliding the slider 14 in the closing direction. As the slider 14 is in the locking configuration shown in FIG. 3, the slider cannot be slid in the opposite opening direction to open the bag. When it is desired to remove the article from the bag, a shop worker can use the detaching magnet 78 to unlock the slider 14, as discussed above, so as to allow the slider 14 to be slid in the opening direction.

It will be appreciated that many adaptations may be made to the zipper, or to the security bag, without departing from the scope of the invention as defined in the claims.

In one such adaptation, the detent 66 and the pivoting locking member 50 may be dispensed with. Instead, the control member 58 may be provided with a locking pin either firmly attached to the control member 58 or formed integrally with the control member 58. The control member 58, together with the associated locking pin, would then be permanently urged downwardly, by the helical spring 64, so that the locking pin interposes between elements 13 of the two rows 10, 12. In this way, the slider 14 would be locked against movement in the opening direction unless and until the detaching magnet 78 is placed against the slider 14 so as to move the control member against the first helical spring 64 into an unlocking position. In this adaptation, the control member 58 would move back into the locking position as soon as the detaching magnet 78 is removed. Accordingly, in this embodiment, it would be necessary to hold the detaching magnet 78 against the slider during the whole time that the slider was being moved in the opening direction.

In another alternative embodiment, it is not necessary for the control member to be fully enclosed. The control member could, for example, take the form of a metal cylinder. Instead of the casing described above, the control member would fit closely within a cylindrical tube having an open end. The control member could then be lifted into an unlocking position by inserting a cylindrical magnet into the open end of the tube, so as to bring the magnet into contact with the control member, and then pulling the magnet upwardly so as to pull the control member upwardly into an unlocking position. The cylindrical tube would prevent a thief from obtaining purchase on the control member either with his fingers or with a tool, as only the planar end surface of the cylindrical locking member would be accessible.

What is claimed is:

1. A zipper having a slider moveable in an opening direction to open the zipper and in a closing direction to close the zipper, the slider comprising a control member and a casing, the control member being moveable between a locking position in which movement of the slider in the opening direction is prevented and an unlocking position in which movement of the slider in the opening direction is allowed, wherein when the control member is in the locking position the casing at least partially encloses the control member so as to substantially prevent the application of a contact force tending to move the control member from the locking position to the unlocking position, the control member being at least partly formed of a material to which a magnetic force is applied by a permanent magnet in proximity whereby to allow the control member to be moved from the locking position to the unlocking position by application of a magnetic force to the control member, wherein the slider is provided with means for resiliently urging the control member into the locking position, wherein the slider has a detent mechanism operable to hold the control member in the unlocking position against the resilient urging means once the control member has been moved to the unlocking position, and wherein the casing is formed of a non-magnetic material.

2. A zipper according to claim 1, wherein the casing substantially fully encloses the control member, the control member being moveable from the locking position to the unlocking position by a magnetic force applied to the control member by a permanent magnet in proximity to and external to the casing.

3. A zipper according to claim 1, wherein the magnetic force is magnetic attraction.

4. A zipper according to claim 1, wherein the material is a ferrite material.

5. A zipper according to claim 1, wherein the slider is provided with a button which can be operated directly by hand to move the control member from the unlocking position to the locking position.

6. A zipper according to claim 5, wherein the button is part of the casing.

7. A zipper according to claim 5, wherein operation of the button over-rides the detent mechanism to move the control member from the unlocking position to the locking position.

8. A zipper according to claim 1, wherein the zipper has two rows of inter-lockable elements and the slider includes a locking member moveable between a locking position and an unlocking position, wherein when the locking member is in the locking position the locking member is interposed between the elements to prevent sliding movement of the slider in the opening direction and when the locking member is in the unlocking position the slider is slideable in the opening direction to open the zipper, movement of the control member from the locking position to the unlocking position causing or allowing the locking member to move from the locking position to the unlocking position.

9. A zipper according to claim 8, wherein the control member is operatively linked to the locking member so that movement of the control member from the locking position to the unlocking position causes the locking member to move from the locking position to the unlocking position.

10. A zipper according to claim 1, wherein the slider defines a Y-shaped channel for receiving two rows of zipper elements, the slider including a locking pin which projects into the Y-shaped channel when the control member is in the locking position.

11. A kit comprising a zipper according to claim 1 and a permanent magnet for moving the control member from the locking position to the unlocking position.

12. A security bag comprising a bag closed by a zipper according to claim 1.

13. A security bag according to claim 12, wherein the bag is formed at least partially from a transparent plastics material so as to allow the contents of the bag to be viewed.

14. A slider for a zipper, comprising a control member and a casing, the control member being moveable between a locking position for preventing opening of a zipper incorporating the slider and an unlocking position for allowing opening of the zipper, wherein when the control member is in the locking position the casing at least partially encloses the control member so as to substantially prevent the application of a contact force tending to move the control member from the locking position to the unlocking position, the control member being at least partly formed of a material to which a magnetic force is applied by a permanent magnet in proximity whereby to allow the control member to be moved from the locking position to the unlocking position by application of a magnetic force to the control member, wherein the slider is provided with means for resiliently urging the control member into the locking position, wherein the slider has a detent mechanism operable to hold the control member in the unlocking position against the resilient urging means once the control member has been moved to the unlocking position, and wherein the casing is formed of a non-magnetic material.

15. A slider according to claim 14, wherein the casing substantially fully encloses the control member, the control member being moveable from the locking position to the unlocking position by a magnetic force applied to the control member by a permanent magnet in proximity to and external to the casing.

16. A slider according to claim 14, wherein the magnetic force is magnetic attraction.

17. A slider according to claim 14, wherein the material is a ferrite material.

18. A slider according to claim 14, wherein the slider is provided with a button which can be operated directly by hand to move the control member from the unlocking position to the locking position.

19. A slider according to claim 18, wherein operation of the button over-rides the detent mechanism to move the control member from the unlocking position to the locking position.

20. A slider according to claim 14, wherein the slider defines a Y-shaped channel for receiving two rows of zipper elements, the slider including a locking pin which projects into the Y-shaped channel when the control member is in the locking position.

21. A zipper having a slider moveable in an opening direction to open the zipper and in a closing direction to close the zipper, the slider comprising a control member and a casing, the control member being moveable between a locking position in which movement of the slider in the opening direction is prevented and an unlocking position in which movement of the slider in the opening direction is allowed, wherein when the control member is in the locking position the casing at least partially encloses the control member so as to substantially prevent the application of a contact force tending to move the control member from the locking position to the unlocking position, the control member being at least partly formed of a material to which a magnetic force is applied by a permanent magnet in proximity whereby to allow the control member to be moved from the locking position to the unlocking position by application of a magnetic force to the control member, wherein the zipper has two rows of inter-lockable elements and the slider includes a locking member moveable between a locking position and an unlocking position, wherein when the locking member is in the locking position the locking member is interposed between the elements to prevent sliding movement of the slider in the opening direction and when the locking member is in the unlocking position the slider is slideable in the opening direction to open the zipper, movement of the control member from the locking position to the unlocking position causing or allowing the locking member to move from the locking position to the unlocking position, wherein the control member is operatively linked to the locking member so that movement of the control member from the locking position to the unlocking position causes the locking member to move from the locking position to the unlocking position, and wherein said operative linkage between the control member and the locking member is magnetic attraction between the control member and the locking member.

22. A zipper having a slider moveable in an opening direction to open the zipper and in a closing direction to close the zipper, the slider comprising a control member and a casing, the control member being moveable between a locking position in which movement of the slider in the opening direction is prevented and an unlocking position in which movement of the slider in the opening direction is allowed, wherein when the control member is in the locking position the casing at least partially encloses the control member so as to substantially prevent the application of a contact force tending to move the control member from the locking position to the unlocking position, the control member being at least partly formed of a material to which a magnetic force is applied by a permanent magnet in proximity whereby to allow the control member to be moved from the locking position to the unlocking position by application of a magnetic force to the control member, wherein the zipper has two rows of inter-lockable elements and the slider includes a locking member moveable between a locking position and an unlocking position, wherein when the locking member is in the locking position the locking member is interposed between the elements to prevent sliding movement of the slider in the opening direction and when the locking member is in the unlocking position the slider is slideable in the opening direction to open the zipper, movement of the control member from the locking position to the unlocking position causing or allowing the locking member to move from the locking position to the unlocking position, wherein the locking member has a pivot portion and a pin portion, the locking member pivoting between the locking position and the unlocking position substantially around a point defined by the pivot portion and the pin portion being interposed between elements to prevent movement of the slider in the opening direction when the locking member is in the locking position.

23. A zipper having a slider moveable in an opening direction to open the zipper and in a closing direction to close the zipper, the slider comprising a control member and a casing, the control member being moveable between a locking position in which movement of the slider in the opening direction is prevented and an unlocking position in which movement of the slider in the opening direction is allowed, wherein when the control member is in the locking position the casing at least partially encloses the control member so as to substantially prevent the application of a contact force tending to move the control member from the locking position to the unlocking position, the control member being at least partly formed of a material to which a magnetic force is applied by a permanent magnet in proximity whereby to allow the control member to be moved from the locking position to the unlocking position by application of a magnetic force to the control member, wherein the zipper has two rows of inter-lockable elements and the slider includes a locking member moveable between a locking position and an unlocking position, wherein when the locking member is in the locking position the locking member is interposed between the elements to prevent sliding movement of the slider in the opening direction and when the locking member is in the unlocking position the slider is slideable in the opening direction to open the zipper, movement of the control member from the locking position to the unlocking position causing or allowing the locking member to move from the locking position to the unlocking position, wherein the slider is provided with means for resiliently urging the control member into the locking position and wherein as the control member moves to the locking position the control member bears against the locking member to urge the locking member into the locking position.

24. A zipper having a slider moveable in an opening direction to open the zipper and in a closing direction to close the zipper, the slider comprising a control member and a casing, the control member being moveable between a locking position in which movement of the slider in the opening direction is prevented and an unlocking position in which movement of the slider in the opening direction is allowed, the casing substantially fully enclosing the control member, the control member being at least partly formed of a material to which a magnetic force is applied by a permanent magnet in proximity whereby to allow the control member to be moved from the locking position to the unlocking position by application of a magnetic force to the control member by a permanent magnet in proximity to and external to the casing, wherein the slider is provided with means for resiliently urging the control member into the locking position, wherein the slider has a detent mechanism operable to hold the control member in the unlocking position against the resilient urging means once the control member has been moved to the unlocking position, and wherein the casing is formed of a non-magnetic material.

* * * * *